United States Patent
Yoshii et al.

(10) Patent No.: US 6,527,559 B2
(45) Date of Patent: Mar. 4, 2003

(54) HUMAN SIZED MANIKIN FOR TRAINING OF AUSCULTATION

(75) Inventors: Chiharu Yoshii, Kita Kyushu (JP); Kenta Ishimori, Kyoto (JP); Takashi Anzai, Kyoto (JP)

(73) Assignee: Kyoto Kagaku Co., Ltd., Kyoto (JP)

( * ) Notice: Subject to any disclaimer, the term of this patent is extended or adjusted under 35 U.S.C. 154(b) by 0 days.

(21) Appl. No.: 09/984,380

(22) Filed: Oct. 30, 2001

(65) Prior Publication Data

US 2002/0051959 A1 May 2, 2002

(30) Foreign Application Priority Data

Oct. 31, 2000 (JP) ......................................... 2000-332437

(51) Int. Cl.[7] .............................................. G09B 23/28
(52) U.S. Cl. ...................................................... 434/266
(58) Field of Search ................................. 434/262, 265, 434/267, 268, 272

(56) References Cited

U.S. PATENT DOCUMENTS

| | | | | |
|---|---|---|---|---|
| 3,665,087 A | * | 5/1972 | Poylo ........................... | 434/266 |
| 3,947,974 A | * | 4/1976 | Gordon et al. ............... | 434/266 |
| 4,798,538 A | * | 1/1989 | Yagi ............................. | 434/262 |
| 4,828,501 A | * | 5/1989 | Ingenito et al. .............. | 434/265 |
| 4,915,635 A | * | 4/1990 | Ingenito et al. .............. | 434/396 |
| 4,932,879 A | * | 6/1990 | Ingenito et al. .............. | 434/262 |
| 5,509,810 A | * | 4/1996 | Schertz et al. ............... | 434/262 |
| 5,584,701 A | * | 12/1996 | Lampotang et al. ......... | 434/272 |
| 5,779,484 A | * | 7/1998 | Lampotang et al. ......... | 434/266 |
| 5,853,292 A | * | 12/1998 | Eggert et al. ................. | 434/262 |
| 5,868,579 A | * | 2/1999 | Lampotang et al. ......... | 434/266 |
| 5,941,710 A | * | 8/1999 | Lampotang et al. ......... | 434/272 |
| 6,159,017 A | * | 12/2000 | Coomansingh ............... | 434/267 |
| 6,193,519 B1 | * | 2/2001 | Eggert et al. ................. | 434/262 |
| 6,220,866 B1 | * | 4/2001 | Amend et al. ................ | 434/266 |
| 6,273,728 B1 | * | 8/2001 | van Meurs et al. .......... | 434/268 |
| 6,443,735 B1 | * | 9/2002 | Eggert et al. ................. | 434/262 |
| 6,461,165 B1 | * | 10/2002 | Takashina et al. ........... | 434/265 |

FOREIGN PATENT DOCUMENTS

| | | |
|---|---|---|
| JP | 5-27113 | 4/1993 |
| JP | 2990602 | 10/1999 |

* cited by examiner

*Primary Examiner*—John Edmund Rovnak
(74) *Attorney, Agent, or Firm*—Rader, Fishman & Grauer PLLC

(57) ABSTRACT

A human sized manikin for the training of auscultation comprising a core body formed of resin foam that has speakers coupled to a living body sound reproducing apparatus and is covered by an imitation skin on the outside of the core body. Recesses are formed on the core body corresponding to sites to be auscultated, a sound reflector with a concaved surface is attached to the outside of each speaker, and this speaker with a reflector is fitted in each recess and supported by the core separately.

4 Claims, 6 Drawing Sheets

F I G. 3
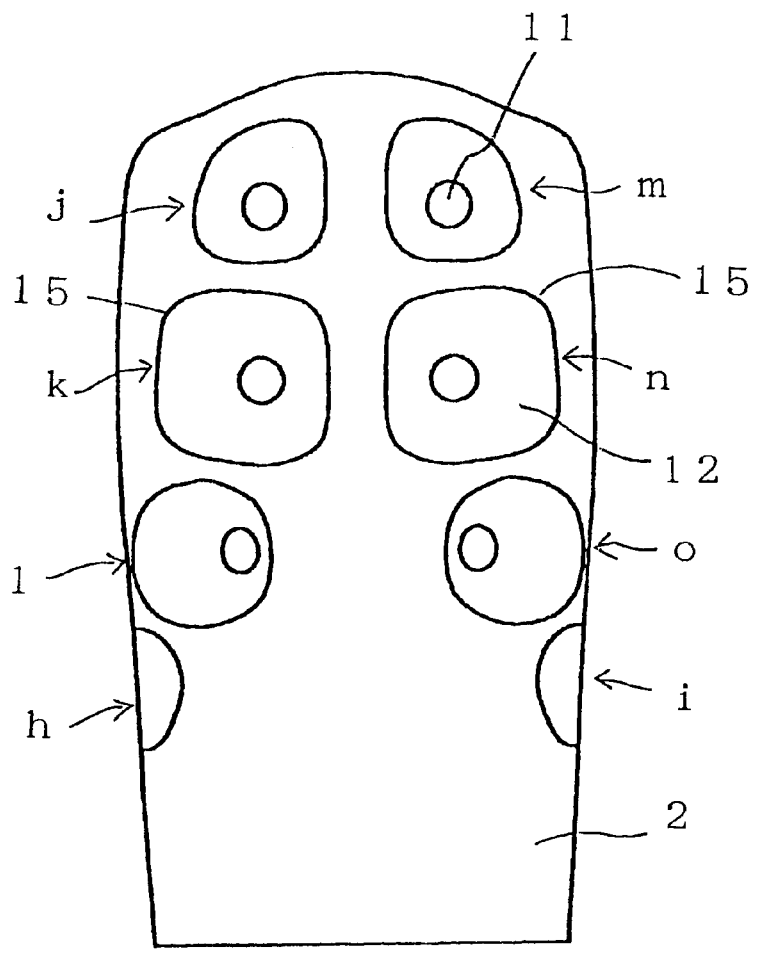

HUMAN SIZED MANIKIN FOR TRAINING OF AUSCULTATION

BACKGROUND OF THE INVENTION

1. Field of the Invention

The present invention relates to a human sized manikin for the training of auscultation comprising a core body made of resin foam that has built-in speakers coupled to a living body sound reproducing apparatus and is covered by a fake skin or an imitation skin on the outside of the core body. This human sized manikin is used for the diagnostic training through auscultation in a medical education course and the like.

2. Description of Related Art

Those known as such kinds of human sized manikins are disclosed in Japanese Patent Application Examined Publication No. H05-27113 and Japanese Patent Publication No. 2990602.

These known techniques allow users to perform the diagnostic training through auscultation by reproduction of pre-recorded normal living body sounds and pre-recorded sounds from patients through small speakers built in sites to be auscultated.

However, when a stethoscope is displaced from the position of a speaker built in the manikin, subtle noise cannot be differentiated from others because propagation power of sounds in soft resin foam is very small. In addition, living body sounds are emitted with certain spreads depending on the positions of sound sources. For example, air cell sounds in lungs or lung sounds are categorized into those from the upper lung field, middle lung field, lower lung field, and bottom lung field, and each of them is also different in the right and left lungs. In addition, the former three sites require auscultation from both the front and back of the human body, so that each of these sounds needs to be auscultated separately. Furthermore, it is important in the training of auscultation to accurately obtain a range in which each sound spreads.

Therefore, the auscultation only at a pinpointed position is inconvenient for users to perform the natural and proper training of auscultation.

The problem to be solved in the present invention is to allow users to perform accurate auscultation of living body sounds at each site to be auscultated and obtain accurate auscultation ranges in a human sized manikin for training of auscultation comprising a core body made of resin foam that has built-in speakers coupled to a living body sound reproducing apparatus and is covered by an imitation skin on the outside of the core body.

SUMMARY OF INVENTION

Technical means to solve this technical problem is (i) forming recesses on a core body corresponding to sites to be auscultated; (ii) attaching a sound reflector with a concaved surface to the outside of each speaker; and (iii) fitting this speaker with a reflector in each recess and making the core body support each of the speakers separately.

The speaker coupled to a living body sound reproducing apparatus can diffuse the reproduced sounds because a sound reflector with concaved surface is attached to the outside of the speaker. Since this speaker with a reflector is fitted in each of the recesses formed corresponding to each site to be auscultated, it emits and spreads sounds outwardly. In addition, the core body supports the speakers separately and thus each of the sounds can accurately be differentiated from others.

Since the outside of the core body is covered with an imitation skin, the living body sounds reproduced are diffused between the reflector and the imitation skin. Therefore, the sounds can be auscultated accurately within certain ranges.

As for the living body sounds, it is sufficient that at least one or two kinds of sounds selected from the lung sounds, heart sounds, murmurs, and miscellaneous organic sounds are reproduced. In this case, besides a separate reproduction of each sound, synchronous reproductions of different kinds of sounds allows performing the various training of auscultation, including differentiation of a sound from combinations of different kinds of sounds or correlation thereof.

The size of the speaker and reflector is determined corresponding to each sound.

As for the lung sounds, as described in the beginning of this specification, auscultation needs to be performed on both the front and back of the body. For this purpose, a rotation axis is embedded and secured in the core body to support the manikin while allowed to rotate in the hoizontal direction, so that switch between the front and back for each auscultation can be obtained naturally.

When sounds are reproduced, digital signals need to be converted into analog signals. When a large number of sounds are reproduced at a time, sound quality may deteriorate because of the property of the D/A board. Then, when the living body sound reproducing apparatus can switch reproductions between the sounds for the front auscultation and those for the back auscultation at the rotation of the manikin, the number of the sounds reproduced at a time can be reduced. Thus the reproduction of the living body sounds can be performed without deterioration of sound quality.

The present invention has an advantage of allowing the proper training of auscultation corresponding to symptoms because accurate auscultation of living body sounds can be performed at each site to be auscultated and auscultation ranges can be obtained.

BRIEF DESCRIPTION OF THE DRAWINGS

FIG. 3 is a back elevation of the core body of the manikin.

DESCRIPTION OF THE PREFERRED EMBODIMENTS

FIGS. 1 to 4 show a front elevation, left side elevation, back elevation, and right side elevation of a core body 2 for auscultation of the lung sounds. The left and light side elevations represent left and right sides of a human body, respectively. They are the reverses of the left and light sides seen toward the human body, respectively.

Figure 5:
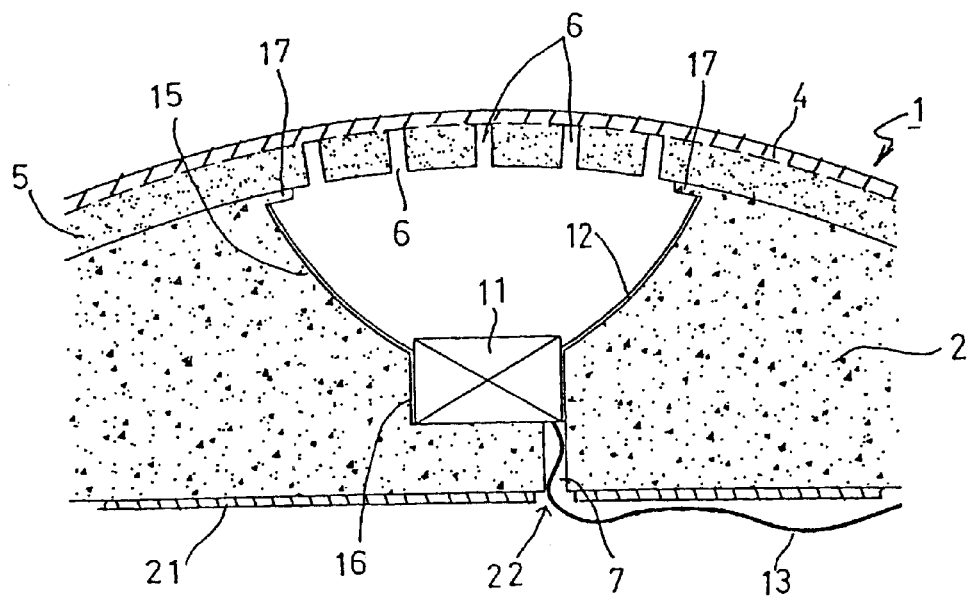
FIG. 5 is a cross section of a particularly part of the manikin.
Figure 6:
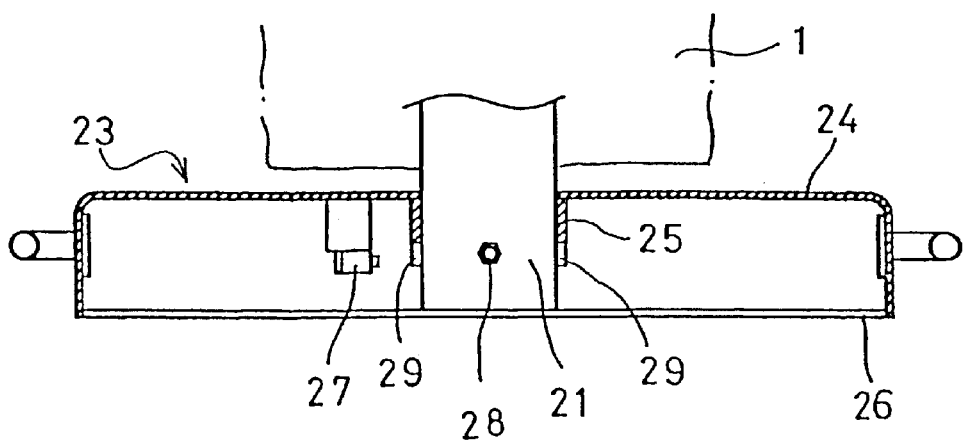
FIG. 6 is a cross section of an exemplary embodiment of a pipe support of the manikin.

In FIG. 5, the manikin 1 has a core body 2 formed of urethane foam resin so as to have proper elasticity. This manikin is structured to have an imitation skin 3 with an inner cover 5 of urethane foam resin laminated the inside of an outer cover 4 formed of hard resin film such as vinyl chloride resin.

The core body and each cover can be formed of other materials as long as they have elasticity.

As mentioned below, recesses 15 for placement of speakers 11 are provided on the core body 2. Providing the inner cover 5 prevents the positions of the recesses 15 from drawing attention when the manikin 1 is palpated.

Each speaker 11, with each reflector 12 attached to its outside, is received in a supporting step part 16 provided at the bottom of the recess 15. The speaker is supported in the recess 15 in a stable manner by engagement of the tip edge of the reflector 12 with engagement parts 17 formed around the opening edge of the recess 15.

In the inner cover 5, a plurality of small holes 6 are opened at the positions corresponding to the recesses 15 so that the inner cover 5 does not cut off the sounds from the speaker 11. The sounds to be reproduced are diffused by the reflector 12, through the pass holes 6 in the inner cover 5, and then auscultated via the outer cover 4 (see FIG. 5).

Desirably, the reflector 12 is shaped to conform to the spread of each site to be auscultated. The reflector can be formed of such materials as hard plastic, metal, wood, and cardboard.

Figure 1:
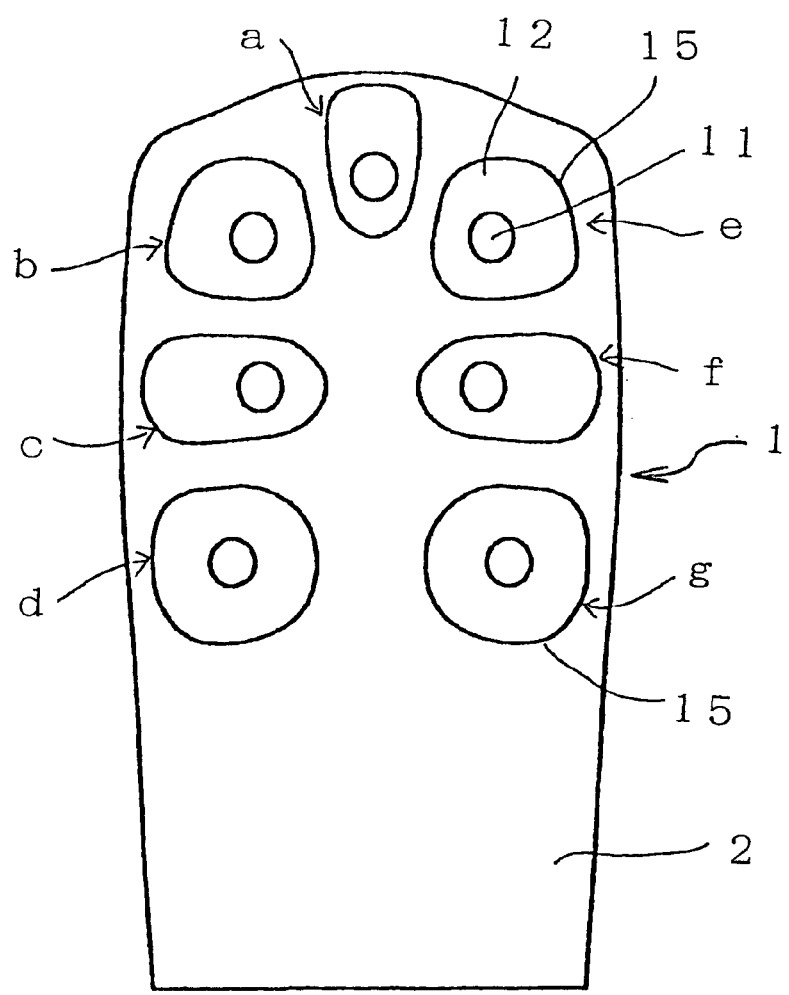
FIG. 1 is an elevation of a core body of a manikin in accordance with an exemplary embodiment of the present invention.
Figure 2:
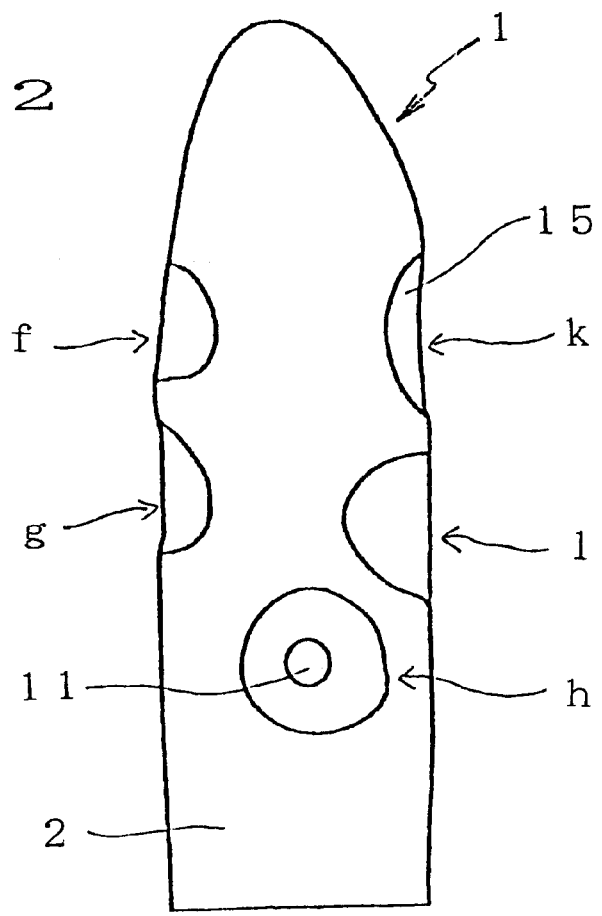
FIG. 2 is a left side elevation of the core body of the manikin.
Figure 4:
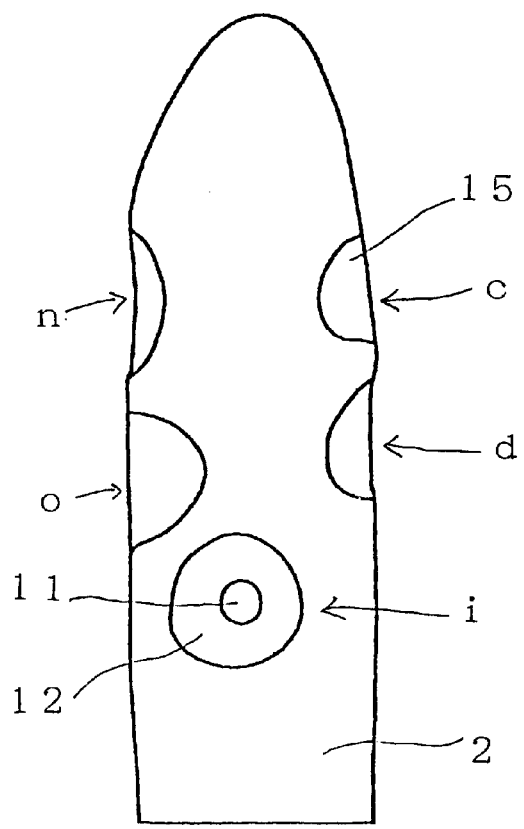
FIG. 4 is a right side elevation of the core body of the manikin.

In the front of the core body 2, the recesses 15 are formed at respective positions of the respiratory system (a), upper lung field right (b), middle lung field right (c), lower lung field right (d), upper lung field left (e), middle lung field left (f) and lower lung field left (g) (see FIG. 1). In the back, the recesses 15 are formed at respective positions of the upper lung field left (j), middle lung field; left (k), lower lung field left (l), upper lung field right (m), middle lung field right (n) and lower lung field right (o) (see FIG. 3). In the left side of the body, a recess is formed at the position of the bottom lung field left (h), while in the right side of the body, at the position of the bottom lung field right (I) (see FIGS. 2 and 4).

At the bottom of each recess 15, a small hole 7 is provided to a guide lead 13 for the speaker 11 and pass all of the leads 13 through the inside of the core body 2.

In this embodiment, a pipe 21 as a rotation axis is embedded vertically in the center and inside of the core body 2 so that an actual medical examination can be performed. In addition, as described below, the pipe is supported by a base 23 so that the lower part of the pipe 21 can be rotated.

Through the cylindrical wall of the pipe 21, holes 22 are provided corresponding to the position of each hole 7 in communication with each recess 15, and the leads 13 are coupled to a living body sound reproducing apparatus (not shown) through the inside of the pipe 21.

The base 23 to support the lower part of the pipe 21 to which the manikin 1 is secured has a cavity formed therein. The lower part of the pipe 21 is inserted into a supporting hole 25 formed in the center of a top plate 24 and the bottom end of the pipe is brought into contact with a bottom plate 26 to support the pipe 21 allowing its rotation.

Figure 7:
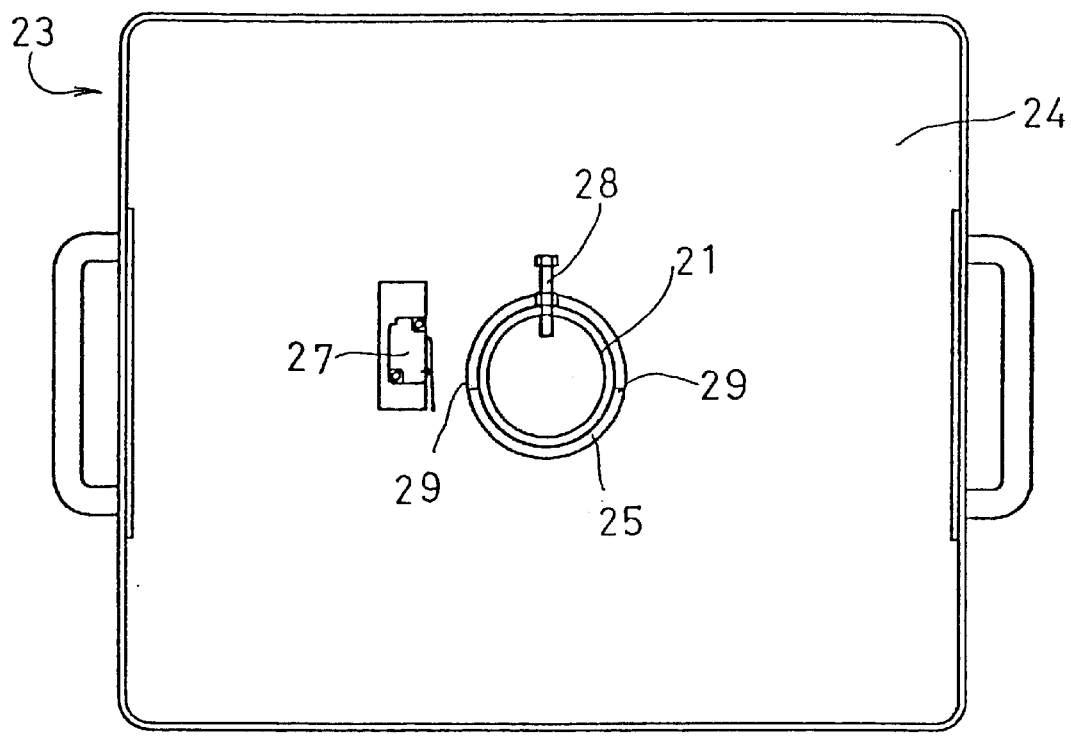
FIG. 7 is a bottom view of the pipe support having removed a bottom plate of a base.

A limit switch 27 is secured to the inside of the base 23, and the lower part of the pipe 21 has a projection 28 to activate this switch. (In the embodiment shown in FIG. 7, a bolt is used as the projection.) The switch 27 is opened/closed by rotating the manikin 1 to allow sounds reproduction from the living body sound reproducing apparatus (not shown) to be switched between the sounds for auscultation of the front body shown in FIG. 1 and those of the back body shown in FIG. 3.

In the bottom edge of the supporting hole 25, steps 29 to come into contact with the projection 28 are formed so that the manikin 1 reciprocatively rotates in a range of 180°, and thereby the limit switch and the sound reproduction can be always switched simultaneously.

As a supporting structure of the pipe 21, other construction can be used. A living body sound reproducing apparatus able to reproduce the sounds from the front and back of the body at the same time does not require such a sound switching device and a controlled rotation range of the manikin 1 above described.

Figure 8:
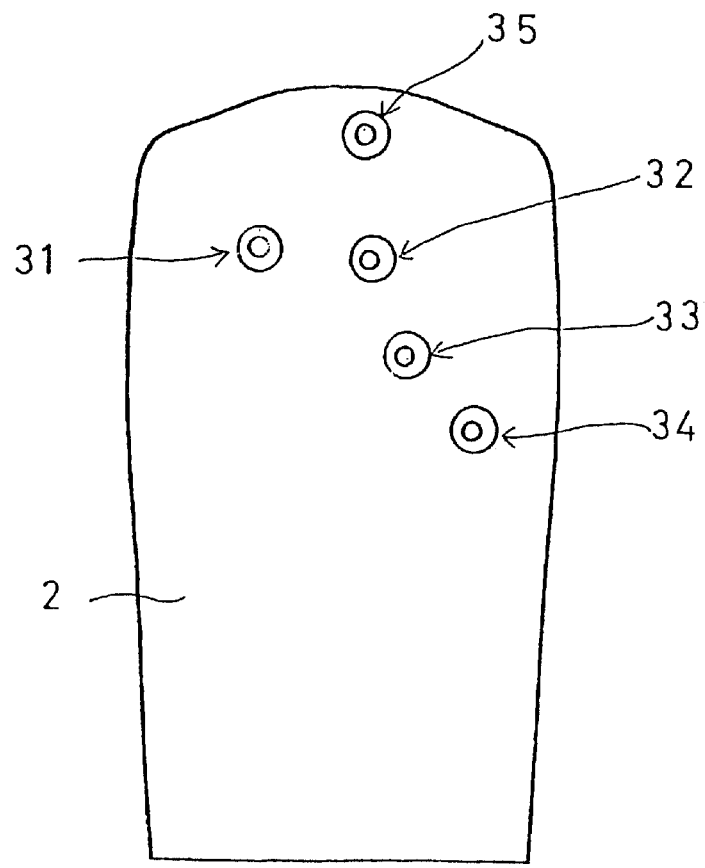
FIG. 8 is a front elevation of a core body of a manikin in accordance with another exemplary embodiment of the present invention.

FIG. 8 shows a front of a core body 2 used in a manikin for auscultation of the pulsation and beat sounds or heart sounds. The core body 2 has small recesses at an aortic valve site 31, a pulmonary valve site 32, a tricuspid valve site 33, a mitral valve site 34 and a carotid artery site 35. A small speaker (not shown) with a circumferential reflector is attached to each of the recesses.

The core body can also be structured as a combination of recesses shown in FIGS. 1 and 8 so that the respiratory system, air cell, artery, beat sounds, and miscellaneous organic sounds can be auscultated at the same time.

What is claimed is:

1. A human sized manikin for the training of auscultation comprising a core body formed of resin foam that has speakers coupled to a living body sound reproducing apparatus and is covered by an imitation skin on the outside of the core body wherein recesses are formed on the core body corresponding to sites to be auscultated, a sound reflector with a concaved surface is attached to the outside of each speaker, and the speaker with a reflector is fitted in each recess and supported by the core separately.

2. The human sized manikin for the training of auscultation as set forth in claim 1 wherein the living body sound reproducing apparatus reproduces at least one or two kinds of sounds selected from the air cell, beat, respiratory system, pulsation sounds, and miscellaneous organic sounds.

3. The human sized manikin for the training of auscultation as set forth in claim 1 wherein a rotation axis for horizontal rotation is embedded in and secured to the inside of the core body.

4. The human sized manikin for the training of auscultation as set forth in claim 3 wherein the rotation of the manikin switches sounds reproduction from the living body sound reproducing apparatus between sounds for the front auscultation and sounds for the back auscultation.

* * * * *